US012257683B2

(12) United States Patent
Lübkert et al.

(10) Patent No.: US 12,257,683 B2
(45) Date of Patent: Mar. 25, 2025

(54) ELECTRIC HAND-HELD POWER TOOL

(71) Applicant: Hilti Aktiengesellschaft, Schaan (LI)

(72) Inventors: Ernst-Rudolf Lübkert, Landsberg am Lech (DE); Karin Groth, Landsberg (DE); Uto Plank, Freising (DE); Manuel Rosenzweig, Kaufering (DE); Andres Wellmann Jelic, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 39 days.

(21) Appl. No.: 17/914,943

(22) PCT Filed: Mar. 25, 2021

(86) PCT No.: PCT/EP2021/057773
§ 371 (c)(1),
(2) Date: Sep. 27, 2022

(87) PCT Pub. No.: WO2021/198023
PCT Pub. Date: Oct. 7, 2021

(65) Prior Publication Data

US 2023/0142832 A1 May 11, 2023

(30) Foreign Application Priority Data

Apr. 3, 2020 (EP) .................................... 20168023

(51) Int. Cl.
*B25D 11/12* (2006.01)
*B25D 17/06* (2006.01)

(52) U.S. Cl.
CPC ............ *B25D 11/125* (2013.01); *B25D 17/06* (2013.01); *B25D 2217/0019* (2013.01);
(Continued)

(58) Field of Classification Search
CPC .................. B25D 11/125; B25D 17/06; B25D 2217/0019; B25D 2250/065;
(Continued)

(56) References Cited

U.S. PATENT DOCUMENTS 3,161,242 A * 12/1964 Etzkorn .............. B25D 17/005 173/109
4,113,035 A * 9/1978 Stiltz ..................... B25D 16/00 173/104
(Continued)

FOREIGN PATENT DOCUMENTS

DE 1298954 B 7/1969
DE 4430161 A1 2/1996
(Continued)

OTHER PUBLICATIONS

International Search Report of PCT/EP2021/057773 dated May 31, 2021.

*Primary Examiner* — Thomas M Wittenschlaeger
*Assistant Examiner* — David G Shutty
(74) *Attorney, Agent, or Firm* — Davidson Kappel LLC

(57) ABSTRACT

An electric hand-held power tool, in particular a hammer drill and/or chipping hammer, having an electropneumatic impact mechanism which has a transmission housing, a guide tube arranged at least partially in the transmission housing, an exciter piston that is movable in an axial direction in the guide tube, a connecting rod coupled to the exciter piston, and an eccentric wheel which is coupled to the connecting rod on one side and is mounted so as to be rotatable with respect to the transmission housing via an end plate of the transmission housing on the other side, wherein the transmission housing is subdivided at least into a main
(Continued)

shell and a cover shell separate from the main shell, such that the guide tube is braced against the main shell at least partially by the cover shell.

19 Claims, 2 Drawing Sheets

(52) U.S. Cl.
CPC .. *B25D 2250/065* (2013.01); *B25D 2250/121* (2013.01); *B25D 2250/231* (2013.01); *B25D 2250/361* (2013.01)

(58) Field of Classification Search
CPC ........ B25D 2250/121; B25D 2250/231; B25D 2250/361
See application file for complete search history.

(56) References Cited

U.S. PATENT DOCUMENTS

| | | | | |
|---|---|---|---|---|
| 7,059,425 | B2 * | 6/2006 | Ikuta | B25D 17/24<br>173/128 |
| 10,507,570 | B2 * | 12/2019 | Ueda | B25F 5/02 |
| 10,864,622 | B2 * | 12/2020 | Yoshikane | B25D 16/00 |
| 2018/0065239 | A1 | 3/2018 | Werner et al. | |

FOREIGN PATENT DOCUMENTS

| | | | | |
|---|---|---|---|---|
| DE | 10201895 | A1 * | 8/2002 | B25D 11/12 |
| DE | 102015205149 | A1 | 9/2016 | |
| EP | 1872911 | A1 | 1/2008 | |
| WO | WO-2019130982 | A1 * | 7/2019 | B25D 17/04 |

* cited by examiner

ELECTRIC HAND-HELD POWER TOOL

The present invention relates to an electric hand-held power tool, in particular a hammer drill and/or chipping hammer, having an electropneumatic impact mechanism which has a transmission housing, a guide tube arranged at least partially in the transmission housing, an exciter piston that is movable in an axial direction in the guide tube, a connecting rod coupled to the exciter piston, and an eccentric wheel. The eccentric wheel is coupled to the connecting rod on one side and is mounted so as to be rotatable with respect to the transmission housing via an end plate of the transmission housing on the other side.

BACKGROUND

Hand-held power tools of the type mentioned at the beginning are known in principle from the prior art.

SUMMARY OF THE INVENTION

It is an object of the present invention to provide a hand-held power tool that is easy to assemble and at the same time is configured preferably in a comparatively lightweight manner.

The present invention provides that the transmission housing is subdivided at least into a main shell and a cover shell separate from the main shell, such that the guide tube is braced against the main shell at least partially by the cover shell. In a particularly preferred configuration, the main shell consists of metal and/or the cover shell consists of plastic.

The invention incorporates the finding that, in hand-held power tools of the prior art, the transmission housing typically has a fully tubular portion into which the guide tube has to be laboriously threaded. Moreover, deep chipping—which is typically necessary in transmission housings of the prior art—is particularly expensive since a relatively large chip volume needs to be removed at a great depth in a relatively small bore. This material to be removed arises from the requirements of die casting. The core for the long inside diameter has to have a certain draft in order that it can be demolded. This then typically results in a certain mass accumulation, which causes the formation of shrinkage cavities in die casting. The cavities represent reduced strength in these regions and are often involved in fracture propagation. As a result of the subdivision, according to the invention, of the transmission housing into a main shell that consists preferably of metal and a cover shell that consists preferably of plastic, this drawback is avoided, since the transmission housing—with the cover shell removed—is open as it were "upwardly". This allows the comparatively easy insertion of the guide tube into the main shell, and easier fitting of the exciter piston, connecting rod and eccentric, which can likewise be inserted into the main shell "from above" through a generous opening—namely the removed cover shell. In particular, complicated threading of the eccentric pin into the connecting rod (or complicated threading of the crankpin into the eccentric wheel) and the subsequent introduction of the exciter piston into the guide tube are dispensed with.

In particular as a result of the preferred configuration of the cover shell made of plastic, a considerable weight reduction of the transmission housing and thus of the entire hand-held power tool can be achieved. In this regard, the invention incorporates the finding that plastic can be provided in precisely that region of the transmission housing in which the smallest cooling air flow is located in hand-held power tools (that is to say in the region in which the smallest heat flow is present during operation), namely above the impact mechanism.

It has been found to be advantageous if the cover shell extends in the axial direction along the entire length of the guide tube. As a result, the impact mechanism region can be cleaned easily and is also accessible comparatively easily for visual inspection.

In one particularly preferred configuration, the main shell and the cover shell are formed in a complementary manner to one another in a radial direction and at least along the guide tube.

In a further preferred configuration, the end plate is formed in one piece with the main shell. Advantageously, as a result, chipping in the region of the integrated end plate can have relatively rough tolerances, with the result that a chip volume is reduced considerably.

It has been found to be advantageous if the main shell has a concave surface portion on which at least one radial rib is formed, which serves for radially and/or axially supporting the guide tube. In one particularly preferred configuration, the radial rib is integrally formed as an unmachined part and/or is formed without chipping.

In a further preferred configuration, the cover shell has, on a side facing the eccentric wheel, a retaining lip. It has been found to be advantageous if the profile of the retaining lip at least partially, preferably entirely, follows a circular path of an eccentric point of the eccentric wheel.

It has been found to be advantageous if the eccentric wheel is mounted in a rotatable manner in the end plate by means of a bearing journal comprised by the impact mechanism, said bearing journal being formed for conjoint rotation with and/or separately from the eccentric wheel.

In one particularly preferred configuration, the eccentric wheel is configured as an externally toothed gearwheel, which can be driven in rotation preferably via an electric motor comprised by the hand-held power tool. It has been found to be advantageous if the cover shell is screwed together with the main shell. The main shell can consist predominantly of metal. The cover shell can consist predominantly of plastic.

BRIEF DESCRIPTION OF THE DRAWINGS

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

In the figures, identical and similar components are denoted by the same reference signs. In the figures.

DETAILED DESCRIPTION

Figure 1:
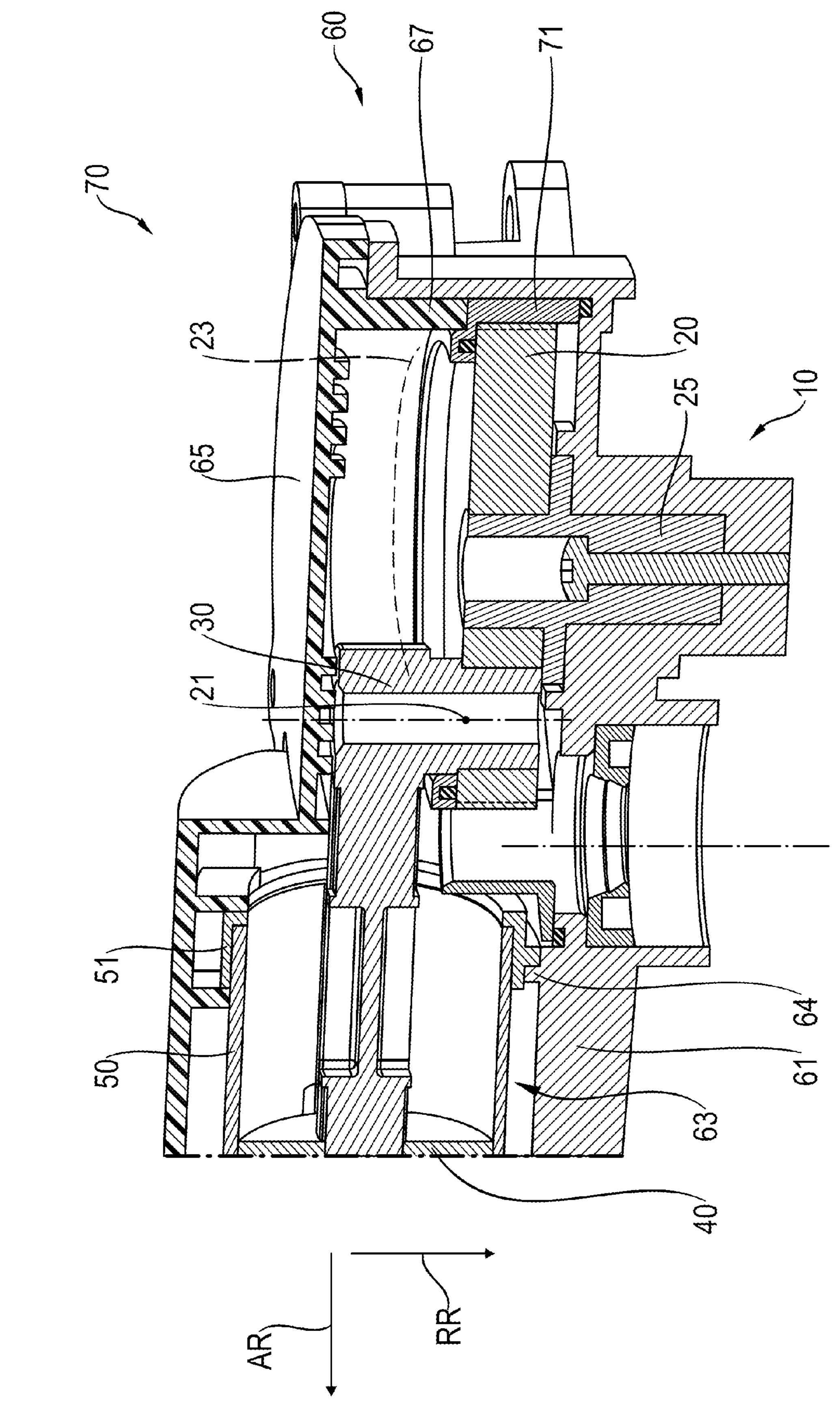
FIG. 1 shows a first preferred exemplary embodiment of an impact mechanism of an electric hand-held power tool.

A first preferred exemplary embodiment of an electropneumatic impact mechanism 70 of an electric hand-held power tool 100 (cf. FIG. 2, for example in the form of a chipping hammer) is illustrated in FIG. 1.

The electropneumatic impact mechanism 70 has a transmission housing 60 and a guide tube 50, wherein the guide tube 50 is arranged at least partially in the transmission housing 60. The electropneumatic impact mechanism 70 also has an exciter piston 40 that is movable in an axial direction AR in the guide tube 50, a connecting rod 30 coupled to the exciter piston 40, and an eccentric wheel 20. The eccentric wheel 20 is coupled to the connecting rod 30 on one side and is mounted so as to be rotatable with respect to the transmission housing 60 via an end plate 10 of the transmission housing 60 on the other side. To be more precise, the eccentric wheel 20 is mounted in a rotatable manner in the end plate 10 by means of a bearing journal 25 comprised by the impact mechanism 70, said bearing journal 25 being formed for conjoint rotation with and separately from the eccentric wheel 20. The eccentric wheel 20 is in the form of an externally toothed gear wheel, which can be driven in rotation via an electric motor.

According to the invention, the transmission housing 60 is subdivided at least into a main shell 61 and a cover shell 65 separate from the main shell 61, such that the guide tube 50 is braced against the main shell 61 at least partially by the cover shell 65. To be more precise, the guide tube 50 has at least one annular retaining collar 51 via which—in a radial direction RR with respect to the guide tube 50—the cover shell 65 is braced against the main shell 61, which for its part is likewise in contact with the retaining collar 51. The cover shell 65 is screwed together with the main shell 61 via screws.

In the exemplary embodiment illustrated here, the main shell 61 consists of metal, for example die-cast aluminum. Since the end plate 10 is formed advantageously in one piece with the main shell 61 here, said end plate 10 likewise consists of die-cast aluminum. The cover shell 65 consists of plastic, for example of polybutylene terephthalate (PBT). As a result of the cover shell 65 being made of plastic, a considerable weight reduction of the transmission housing 60 overall is achieved.

As is likewise apparent from FIG. 1, the cover shell 65 has, on a side facing the eccentric wheel 20, a retaining lip 67, the profile of which at least partially follows a circular path 23 of an eccentric point 21 of the eccentric wheel 20. In this way, the connecting rod 30, the eccentric wheel 20 and the bearing journal 25 are secured against lifting in a radial direction RR (upwardly in FIG. 1). It should be noted that the radial direction RR and the axial direction AR, in the context of this description, are always with respect to the guide tube 50, wherein the axial direction AR is oriented coaxially with the direction of movement of the exciter piston 40.

A separating cap 71 that is arranged between the main shell 61 and the cover shell 65 and engages around at least the eccentric wheel 20 is optionally provided.

Figure 2:
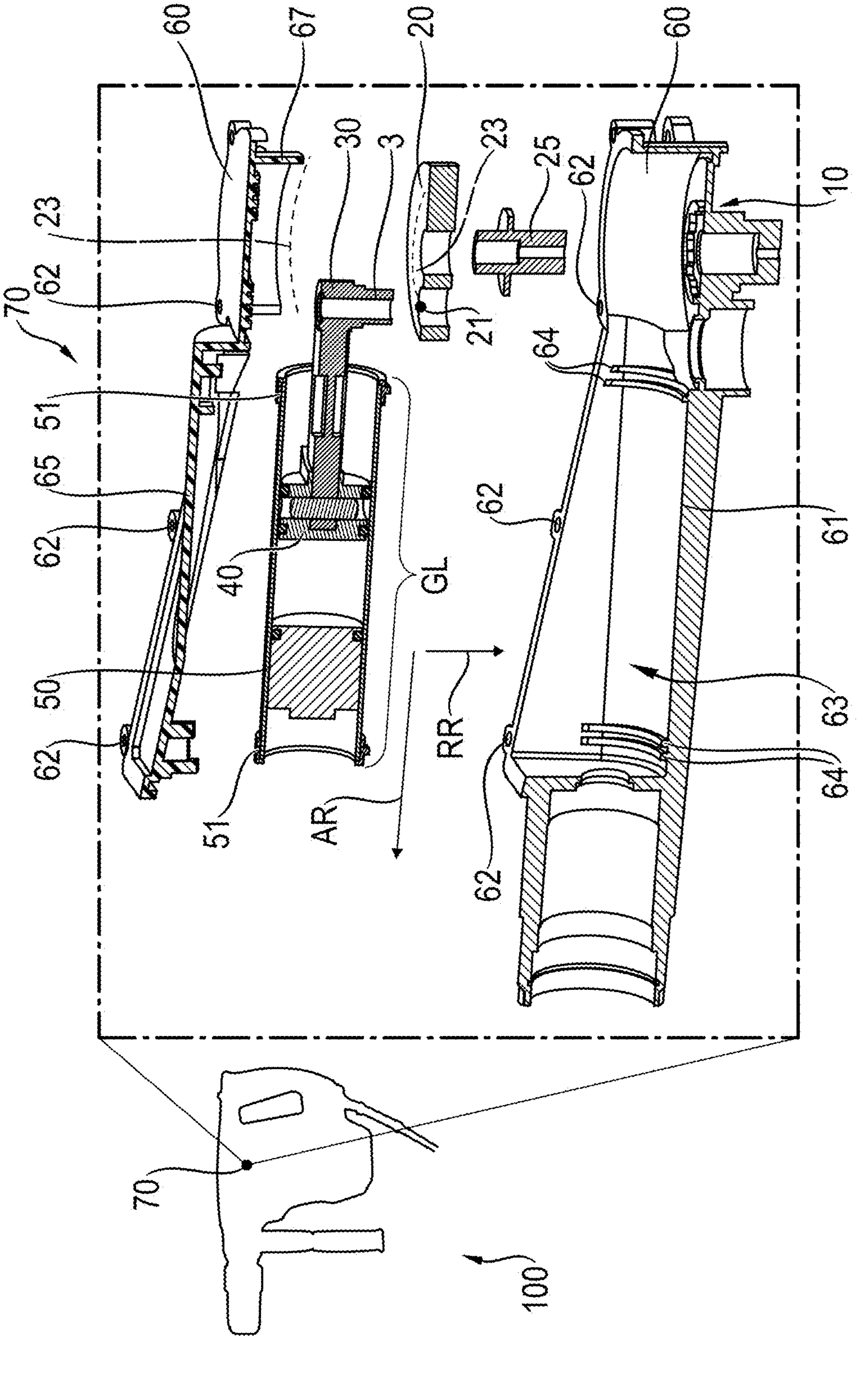
FIG. 2 shows a second preferred exemplary embodiment of an impact mechanism of an electric hand-held power tool in an exploded illustration.

A second preferred exemplary embodiment of an electropneumatic impact mechanism 70 of an electric hand-held power tool 100, for example in the form of a chipping hammer) is illustrated—in an exploded illustration—in FIG. 2. The main difference from the exemplary embodiment in FIG. 1 is the absence of the separating cap 71.

As is apparent from FIG. 2, the cover shell 65 extends in the axial direction AR along the entire length GL of the guide tube 50. In this way—the cover shell 65 consists for example of plastic—a considerable weight saving compared with impact mechanisms of the prior art is achieved. This also allows the comparatively easy insertion of the guide tube 50 into the main shell 61, and easier fitting of the exciter piston 40, connecting rod 30 and eccentric 20, which can likewise be inserted into the main shell 61 from above (i.e. from the side of the main shell 61 facing away from the end plate 10) through a generous opening—namely the removed cover shell 65. In particular, complicated threading of the crankpin 31 into the eccentric wheel 20 and the subsequent introduction of the exciter piston 40 into the guide tube 50 are made much easier.

It is readily apparent that the main shell 61 and the cover shell 65 are formed in a complementary manner to one another in a radial direction RR and at least along the guide tube 50. The inner surfaces of the main shell 61 and the cover shell 65 complement one another to form a full cylinder in which the guide tube 50 is entirely received. In particular, as a result of this complementary configuration, the bearing cover 65 consisting of plastic reinforces the main shell 61 of the transmission housing 60 in such a way that the main shell 61 does not lose rigidity as a result of the screw connections (indicated in FIG. 2 by the screw holes 62).

The main shell 61 has a concave surface portion 63 on which for example four radial ribs 64 are formed here, which serve for radially and axially supporting the guide tube 50. Advantageously, the radial ribs 64 are integrally formed as unmachined parts on the main shell 61 and remain without chipping.

LIST OF REFERENCE SIGNS

10 End plate
20 Eccentric wheel
21 Eccentric point
23 Circular path
25 Bearing journal
30 Connecting rod
31 Crankpin
40 Exciter piston
50 Guide tube
51 Retaining collar
60 Transmission housing
61 Main shell
62 Screw hole
63 Concave surface portion
64 Radial rib
65 Cover shell
67 Retaining lip
70 Impact mechanism
71 Separating cap
100 Electric hand-held power tool
AR Axial direction
GL Entire length
RR Radial direction

What is claimed is:

1. An electric hand-held power tool comprising:

an electropneumatic impact mechanism having a transmission housing, a guide tube arranged at least partially in the transmission housing, an exciter piston movable in an axial direction in the guide tube, a connecting rod coupled to the exciter piston, and an eccentric wheel coupled to the connecting rod on one side and mounted so as to be rotatable with respect to the transmission housing via an end plate of the transmission housing on the other side, the transmission housing being subdivided at least into a main shell and a cover shell separate from the main shell, such that the guide tube is braced against the main shell at least partially by the cover shell, wherein the cover shell extends in the axial direction along an entire length of the guide tube, and wherein the cover shell is in direct contact with the guide tube.

2. The hand-held power tool as recited in claim 1 wherein the main shell and the cover shell are formed in a complementary manner to one another in a radial direction and at least along the guide tube.

3. The hand-held power tool as recited in claim 1 wherein the main shell consists of metal.

4. The hand-held power tool as recited in claim 3 wherein the cover shell consists of plastic.

5. The hand-held power tool as recited in claim 1 wherein the cover shell consists of plastic.

6. The hand-held power tool as recited in claim 1 wherein the end plate is formed in one piece with the main shell.

7. The hand-held power tool as recited in claim 1 wherein the main shell has a concave surface portion, at least one radial rib being formed on the concave surface portion for radially or axially supporting the guide tube.

8. The hand-held power tool as recited in claim 7 wherein the radial rib is integrally formed as an unmachined part or is formed without chipping.

9. The hand-held power tool as recited in claim 1 wherein the cover shell has, on a side facing the eccentric wheel, a retaining lip with a profile at least partially following a circular path of an eccentric point of the eccentric wheel.

10. The hand-held power tool as recited in claim 1 wherein the cover shell is screwed together with the main shell.

11. The hand-held power tool as recited in claim 1 wherein the eccentric wheel is mounted in a rotatable manner in the end plate via a bearing journal comprised by the impact mechanism.

12. The hand-held power tool as recited in claim 11 wherein the bearing journal is formed for conjoint rotation with the eccentric wheel.

13. The hand-held power tool as recited in claim 11 wherein the bearing journal is formed separately from the eccentric wheel.

14. A hammer drill or chipping hammer comprising the hand-held power tool as recited in claim 1.

15. The hand-held power tool as recited in claim 1 wherein inner surfaces of the main shell and cover shell complement one another to form a full cylinder receiving the guide tube.

16. The hand-held power tool as recited in claim 1 wherein the main shell has at least one radial rib extending circumferentially only partly around an outer circumference of the guide tube.

17. The hand-held power tool as recited in claim 16 wherein the at least one radial rib includes two radial ribs.

18. The hand-held power tool as recited in claim 1 wherein main shell and the cover shell each have screw holes lining up with each other to allow the cover shell to be directly screwed to the main shell.

19. The hand-held power tool as recited in claim 1 further comprising a separating cap arranged between the main shell and the cover shell and engaging around the eccentric wheel.

* * * * *